US009152302B2

(12) United States Patent
Pizurica et al.

(10) Patent No.: US 9,152,302 B2
(45) Date of Patent: Oct. 6, 2015

(54) METHOD TO OBTAIN A VIRTUAL DESKTOP STORED IN A CLOUD STORAGE SYSTEM, A CORRESPONDING CLOUD BROKER AND CLOUD DESKTOP AGENT

(71) Applicant: Awingu NV, Ghent (BE)

(72) Inventors: Veselin Pizurica, Ghent (BE); Kurt Bonne, Haren (BE)

(73) Assignee: Awingu, NV, Ghent (BE)

( * ) Notice: Subject to any disclaimer, the term of this patent is extended or adjusted under 35 U.S.C. 154(b) by 0 days.

(21) Appl. No.: 13/940,851

(22) Filed: Jul. 12, 2013

(65) Prior Publication Data
US 2014/0165164 A1    Jun. 12, 2014

(30) Foreign Application Priority Data
Jul. 13, 2012    (EP) .................................... 12176461

(51) Int. Cl.
| | |
|---|---|
| *G06F 7/04* | (2006.01) |
| *G06F 3/0482* | (2013.01) |
| *H04L 29/08* | (2006.01) |
| *H04W 4/00* | (2009.01) |
| *H04L 29/06* | (2006.01) |
| *G06F 9/44* | (2006.01) |
| *G06F 9/445* | (2006.01) |

(52) U.S. Cl.
CPC ............ *G06F 3/0482* (2013.01); *G06F 9/4445* (2013.01); *H04L 63/08* (2013.01); *H04L 67/36* (2013.01); *H04W 4/003* (2013.01); *G06F 9/4451* (2013.01)

(58) Field of Classification Search
None
See application file for complete search history.

(56) References Cited

U.S. PATENT DOCUMENTS

| | | | |
|---|---|---|---|
| 2008/0228865 A1* | 9/2008 | Cruzada ........................ 709/203 |
| 2010/0131654 A1 | 5/2010 | Malakapalli et al. | |
| 2011/0184993 A1 | 7/2011 | Chawla et al. | |
| 2012/0066607 A1* | 3/2012 | Song et al. .................... 715/737 |

FOREIGN PATENT DOCUMENTS

EP    2357558 A2    8/2011

OTHER PUBLICATIONS

Search Report from corresponding EP Application No. 12176461.7, Dec. 6, 2012.

* cited by examiner

*Primary Examiner* — Brandon Hoffman
(74) *Attorney, Agent, or Firm* — Workman Nydegger

(57) ABSTRACT

A method to obtain a cloud-stored virtual desktop includes a set of user preferences, applications and shortcuts to files that a user desires to access. The method includes (A) transferring from a client device to a cloud broker a virtual desktop request comprising a user identification and a client device type identification; (B) passing the virtual desktop request to a cloud desktop agent responsible for maintenance of virtual desktops and virtual desktop metadata in the cloud storage system; (C) selecting by the cloud desktop agent a list of available virtual desktops for the user and the client device type based on a comparison with the virtual desktop metadata; (D) transferring the list of available virtual desktops to the cloud broker; and (E) forwarding the list of available virtual desktops from the cloud broker to the client device to enable the user to select a virtual desktop to be opened.

10 Claims, 3 Drawing Sheets

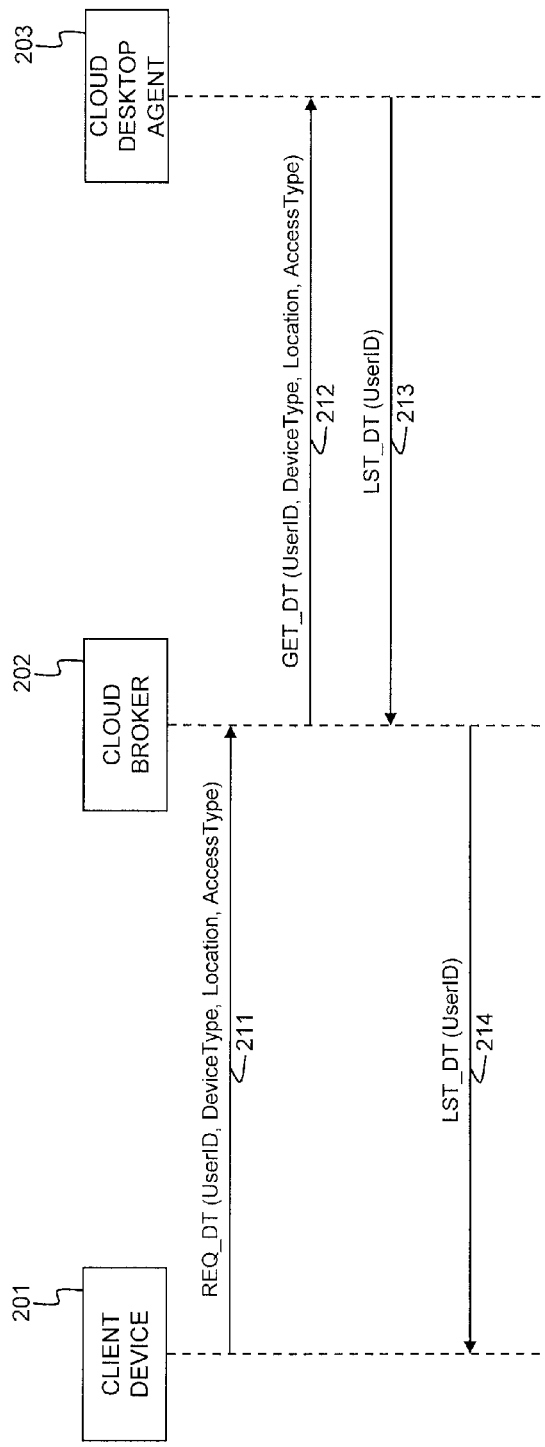
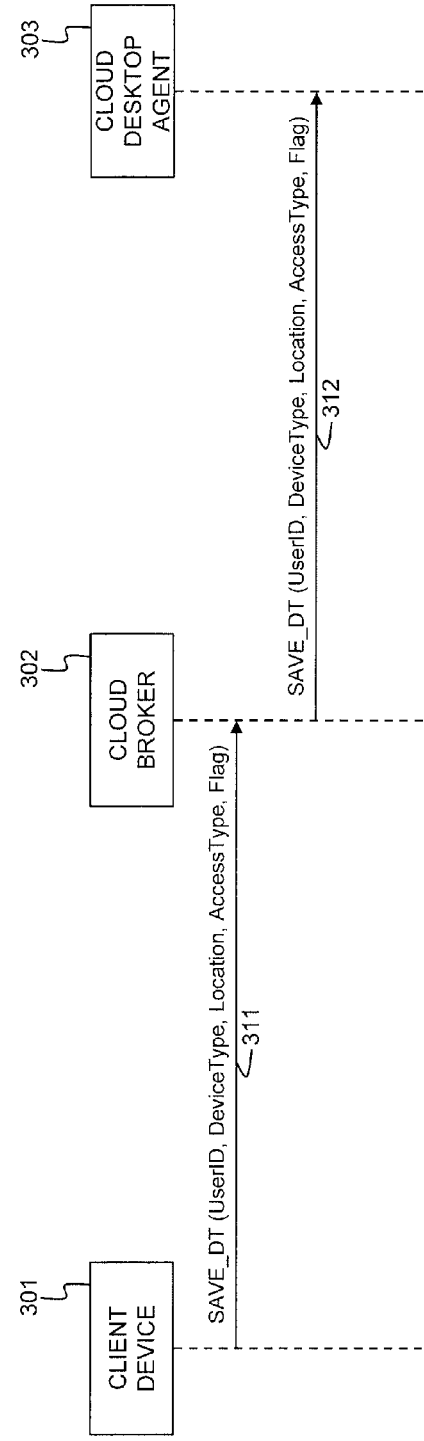

METHOD TO OBTAIN A VIRTUAL DESKTOP STORED IN A CLOUD STORAGE SYSTEM, A CORRESPONDING CLOUD BROKER AND CLOUD DESKTOP AGENT

CROSS REFERENCES TO RELATED APPLICATIONS

This application claims priority to European Application No. EP 12176461.7, filed on Jul. 13, 2012, the contents of which are incorporated herein by specific reference.

FIELD OF THE INVENTION

The present invention generally relates to storage, retrieval and the exchange between different users and/or devices of virtual desktops. In the context of the current patent application, a virtual desktop is a cloud-stored set of user preferences, applications and shortcuts to files or data that need to be easily accessible for the user. The virtual desktop in other words is a desktop that does not reside on the user's device, but is stored in the cloud storage system, next to the user data stored in the cloud. The present invention in particular concerns a way to obtain upon request of a user a preferred virtual desktop representation given the device type (laptop, tablet PC, smartphone, . . . ) and eventually also the location (office, home, public location, . . . ) and type of access (private/corporate).

BACKGROUND OF THE INVENTION

A desktop defines a set of user preferences, e.g. menu bars as well as their look and feel, applications and shortcuts to files that a user desires to access easily, e.g. through a single mouse click or finger touch. As a consequence, a desktop provides a unique view over one or plural storage spaces of the same user, like for instance the user's private and public cloud storage, the user's local hard disk storage, the user's dropbox storage space, the user's google drive storage space, etc. On a PC or laptop, a desktop definition per user is stored locally, on the hard disk. In a corporate network, a desktop definition per user is stored centrally, on a server. In case the desktop is a corporate desktop, it shall typically also prevent access to some of the storage spaces such as particular cloud storages, the dropbox storage space, etc. for security reasons.

In the above definition of desktop, the term "shortcut to files" must be interpreted broadly to cover any shortcut to directories, subdirectories, documents, data, etc., whether stored on the client device, private or corporate servers, or in a cloud storage environment. It is further noticed that a single user can define more than one desktop stored locally.

Whereas a desktop is a locally stored set of user preferences, applications and shortcuts to files that a user desires to access easily after login on his/her client device, a virtual desktop in the context of the present patent application is a set of user preferences, applications and shortcuts to files that the user desires to access easily, that is stored remotely, in a cloud storage system. A virtual desktop in other words does not reside on any of the user's client devices, e.g. his laptop, tablet PC or smartphone, but is stored in a cloud storage system and pushed back to the user's client device after login. Similarly to traditional desktops, a single user can define more than one virtual desktop stored in the cloud storage system.

One example of such virtual desktop is the Transferable Desktop from ZeroPC, of which a description can be retrieved from the Internet via the URL:

www.zeropc.com/go.htm?src=transfer.html

The Transferable Desktop solution from ZeroPC enables a user to customize one or more virtual desktops, stored in a cloud storage system, and to share one or more of his desktops with other users in the cloud environment.

ZeroPC however does not allow to create virtual desktops per device type. With the introduction of "bring your own device" policies in corporate organizations, different corporate users will desire different virtual desktops depending on the device or devices they are using.

Further, corporate organizations desire to define and control the access policy from one place, such that for instance a corporate IT department can block access to one or some of the public cloud storage providers by disabling access to them through the virtual desktop definitions.

European Patent Application EP 2 357 558 A2 entitled "Independent access to virtual machine desktop content" recognizes in paragraph [0008] the desire of users to use any type of device to access data stored in the cloud, and the complexity of delivering and running virtual desktops on a wide spectrum of devices. EP 2 357 558 thereto proposes an Enhanced Virtual Desktop Management System enabling a user to access its data, applications and settings stored in cloud storage. The Enhanced Virtual Desktop Management System known from EP 2 357 558 uses an API incorporated in the web browser or other third party interface providing access to the user's data without running a virtual desktop (see for instance paragraphs [0042] and [0046]).

It is an objective of the present invention to disclose a method and system for obtaining a virtual desktop that overcomes the above mentioned drawbacks of existing solutions. More particularly, it is an objective of the present invention to disclose a method and system for obtaining upon request of a user a preferred virtual desktop representation for that user and the device type (laptop, tablet PC, smartphone, . . . ) of that user. It is a further objective to obtain upon request of a user a preferred virtual desktop representation for the location (office, home, public location, . . . ) of that user. It is a further objective to obtain upon request of a user a preferred virtual desktop representation considering the type of access (private/corporate) of that user.

SUMMARY OF THE INVENTION

According to the invention, the above defined objectives are realized by a method to obtain a virtual desktop comprising a set of user preferences, applications and shortcuts to files that a user desires to access, the virtual desktop being stored in a cloud storage system, the method comprising:

A. transferring from a client device of the user to a cloud broker a virtual desktop request comprising at least a user identification and a client device type identification;

B. passing the virtual desktop request from the cloud broker to a cloud desktop agent responsible for maintenance of virtual desktops and virtual desktop metadata in the cloud storage system;

C. selecting by the cloud desktop agent a list of available virtual desktops for the user and the client device type based on a comparison of the virtual desktop request with the virtual desktop metadata;

D. transferring in response to the virtual desktop request from the cloud desktop agent to the cloud broker the list of available virtual desktops; and E. forwarding the list of available virtual desktops from the cloud broker to the client device to enable the user to select a virtual desktop to be opened.

Thus, at the time the user initiates a request for a cloud-stored virtual desktop, information identifying the user and the type of device is passed to a cloud broker, e.g. an HTTP cloud broker that tunnels cloud IO events to different client devices using WebSockets or HTTP REST calls. The cloud broker shall pass the request including the user identification and device type identification to a cloud desktop agent, i.e. a software program residing in the cloud environment responsible for managing, i.e. storing, selecting and deleting virtual desktops and virtual desktop metadata. The cloud desktop agent compares the information in the request identifying the user and device type with the virtual desktop metadata and selects a list of virtual desktops accessible by that user and suitable for the client device from which the user has issued the request. The list of available virtual desktops is sent to the cloud broker which in turn delivers the list to the client device.

Through the current invention, the user is enabled to choose the preferred virtual desktop after logging-in from a list of available virtual desktops that suit the client device he is using. The user can share his virtual desktop with other devices. Assuming that other users have access rights to the underlying data, the user can also share his virtual desktop with other users by simply sending the virtual desktop definition from one device to another.

It is noticed that the user can also decide to create a new virtual desktop and store it in the cloud storage system via the cloud broker.

According to a further aspect of the invention, the method to obtain a virtual desktop according the present invention comprises transferring user credentials of the user from the client device to the cloud broker, authenticating the user at the cloud broker, and executing the steps B, C and D only after successful authentication.

Thus, at the time of the request, the user can either provide his credentials or not. In case the user provides his credentials or login information, the cloud broker can authenticate the user and only after successful authentication pass the request to the cloud desktop agent (step B). The latter shall return a list containing all configured virtual desktops for that user that match the given device type (step C) and this list will be forwarded by the cloud broker to the client device of the user (step D) enabling the user to open the virtual desktop he/she prefers. In case no user credentials are provided, the cloud broker can pass the client device's IP address to the cloud desktop agent which can check which Virtual Private Networks (VPNs) are registered for that IP address. In case the cloud desktop agent concludes that the request is received from a predefined VPN, a default desktop with login request can be returned. The default virtual desktop can for instance be a default corporate virtual desktop in case the request is received from a corporate network. This may for instance be the case in a corporate organization with "bring your own device" policy where the device automatically connects to the corporate network, e.g. through WiFi, even prior to the user actually logging in with his user credentials, i.e. his corporate username and password. The default corporate virtual desktop may already provide some read-only access to a set of files that can be shared without authentication.

According to an optional aspect of the method to obtain a virtual desktop according to the present invention, the virtual desktop request further comprises a location identification, and in step C a list of available virtual desktops for the user, the client device type and the location is selected based on a comparison of the virtual desktop request with the virtual desktop metadata.

Indeed, in selecting a list of appropriate virtual desktops, the cloud desktop agent preferably also matches a location identifier in the request with location information stored as part of the virtual desktop metadata. The location information may for instance indicate if the user sends the request from home, from his office, or from a public spot. Depending on the location, the preferential virtual desktop may be different. E.g. the set of applications or files that the user desires to access from a public spot may differ from the set of applications or files that the same user using the same device desires to access from his office.

According to another optional aspect of the method to obtain a virtual desktop according to the present invention, the virtual desktop request further comprises an access type identification, and in step C a list of available virtual desktops for the user, the client device type and the access type is selected based on a comparison of the virtual desktop request with the virtual desktop metadata.

Thus, in selecting a list of appropriate virtual desktops, the cloud desktop agent preferably also compares an identification of the access type in the request, i.e. whether the request comes from a corporate or private network, with access type information stored as part of the virtual desktop metadata. Indeed, the virtual desktop metadata can be enhanced with information indicating if the virtual desktop definition contains corporate or private data. Depending on the type of access, the preferential virtual desktop may be different. E.g. certain applications or files that the user can access from a corporate access point may be blocked for access from a private point for security reasons.

In accordance with another optional aspect, the method to obtain a virtual desktop according to the present invention comprises:

re-directing the user request to a private virtual desktop environment in case the access type is private access or re-directing the user request to a corporate virtual desktop environment in case the access type is corporate access.

Thus, in case the user request specifies private access, the same cloud broker can re-direct the user's request for a virtual desktop to a private virtual desktop environment that is backed by private storage space. Such private storage space could reside with the same cloud storage provider as the corporate storage space, or with a different cloud storage provider.

Further optionally, the method to obtain a virtual desktop according to the present invention for corporate type of access may comprise the step of:

verifying at the cloud desktop agent which Virtual Private Networks or VPNs are registered.

Indeed, as mentioned already above, a device may automatically connect to a corporate network prior to the user logging in with his user credentials. This will for instance be the case if the corporation has deployed a WiFi network and the user's client device has already been connected to the corporate network in the past. If the IP address of the device can be correlated with the registered VPNs of the corporation, a default corporate virtual desktop incorporating a customized login page with limited access to certain files may be returned. The cloud desktop agent preferably can access the IP VPN definitions of different corporations in order to select a default corporate virtual desktop of the appropriate corporation before the user has successfully logged into the corporate network.

As is further specified, the method according to the present invention may foresee for corporate type of access in the step of:

returning a default corporate virtual desktop upon unsuccessful authentication.

The default corporate virtual desktop shall typically contain a customized login page enabling the user to submit his user credentials. In addition thereto, the default corporate virtual desktop may already provide access to a limited set of files and/or applications.

Still optionally, the method to obtain a virtual desktop according the present invention may further comprise:

returning a default login page upon access from a public IP address.

Hence, in case the request for a virtual desktop is received from a public IP address, the cloud broker shall only provide a default login page.

As further defined, the virtual desktop request may be an HyperText Transfer Protocol or HTTP request and the cloud broker may be an HTTP broker.

The HTTP cloud broker is a server that tunnels cloud IO events to different HTML clients using WebSockets or HTTP REST calls.

In addition to the method, the present invention also relates to a corresponding cloud broker, adapted to tunnel cloud IO events to/from different client devices in a cloud storage environment in order to enable a user to obtain a virtual desktop comprising a set of user preferences, applications and shortcuts to files that the user desires to access, the virtual desktop being stored in said cloud storage system, the cloud broker comprising:

A. an interface configured to receive from a client device of a user a virtual desktop request comprising at least a user identification and a client device type identification;

B. an interface configured to tunnel the virtual desktop request to a cloud desktop agent responsible for maintenance of virtual desktops and virtual desktop metadata in the cloud storage system;

C. an interface configured to receive in response to the virtual desktop request from the cloud desktop agent a list of available virtual desktops for the user and the client device type, the list of available virtual desktops being selected by the cloud desktop agent based on a comparison of the virtual desktop request with the virtual desktop metadata; and D. an interface configured to forward the list of available virtual desktops to the client device to enable the user to select a virtual desktop to be opened.

Furthermore, the present invention relates to a corresponding cloud desktop agent able, adapted to maintain virtual desktops and virtual desktop metadata in a cloud storage system in order to enable a user to obtain a virtual desktop comprising a set of user preferences, applications and shortcuts to files that the user desires to access, the virtual desktop being stored in the cloud storage system, the cloud desktop agent comprising:

A. an interface configured to receive from a cloud broker a virtual desktop request comprising at least a user identification and a client device type identification;

B. virtual desktop selection logic, adapted to select a list of available virtual desktops for the user and the client device type based on a comparison of the virtual desktop request with the virtual desktop metadata; and C. an interface configured to send in response to the virtual desktop request to the cloud broker a list of available virtual desktops, to thereby enable the cloud broker to forward the list of available virtual desktops to the client device to enable the user to select a virtual desktop to be opened.

BRIEF DESCRIPTION OF THE DRAWINGS

FIG. 2 illustrates an embodiment of the method for obtaining a virtual desktop according to the present invention;

FIG. 3 illustrates storage of a virtual desktop that can be obtained through the method according to the present invention;

DETAILED DESCRIPTION OF EMBODIMENT(S)

Figure 1:
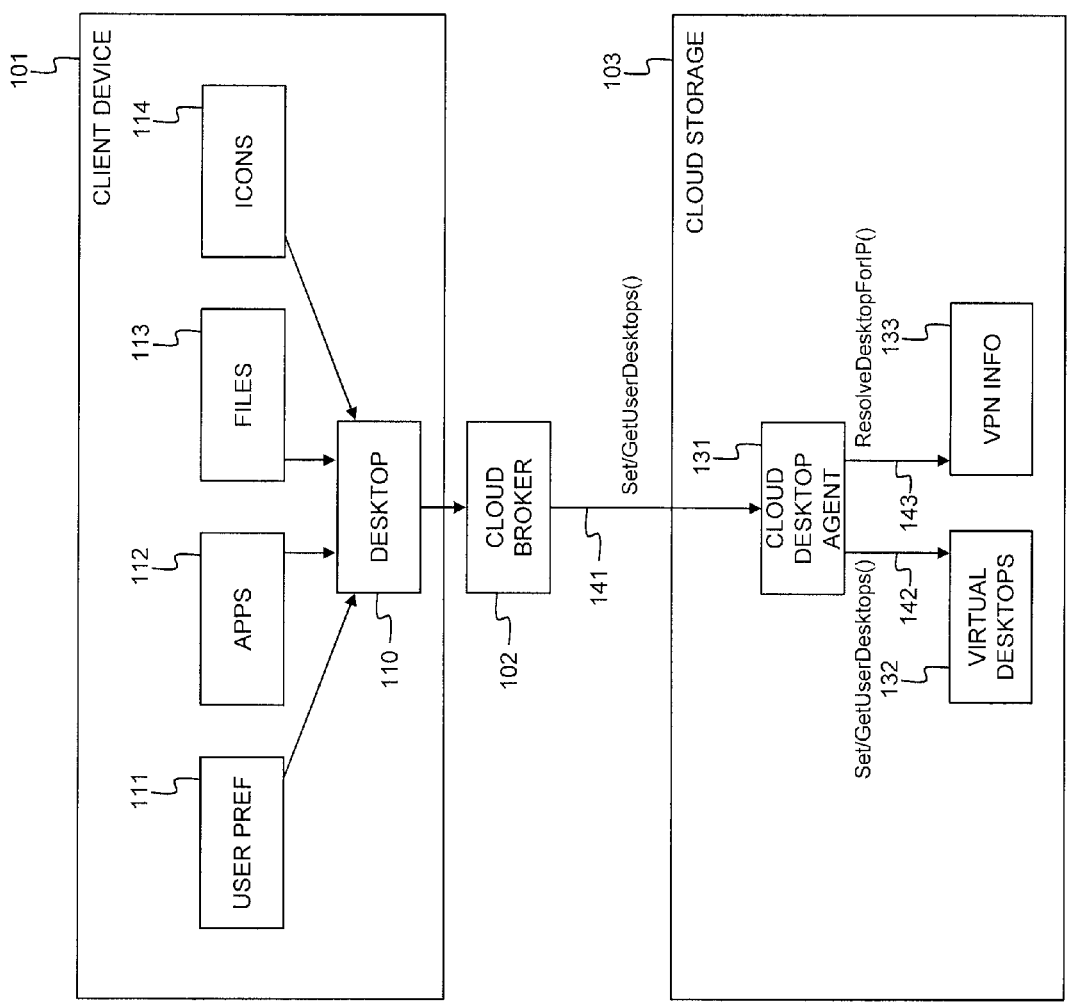
FIG. 1 is a functional block diagram of a cloud storage environment incorporating an embodiment of the cloud broker and cloud desktop agent according to the present invention.

FIG. 1 is a functional block diagram showing a client device 101, cloud broker 102 and cloud storage system 103. A user desktop 110 on client device 101 is defined as a set of user preferences 111, applications 112 and files 113 that the user of client device 101 desires to easily access after login on the client device 101. The user preferences 111, applications 112, and files 113 are typically made accessible through clickable icons 114 that form part of the desktop 110. The user can define more than one desktop. The representation of a desktop can depend on the device type, the IP address (or other identification) of the user, the location of the user, and the access type, e.g. if the same client device 101 can be used to access either private or corporate data. They form the metadata of the desktop 110.

Through SetUserDesktops( ) messages 141 and 142, the desktop definition and desktop metadata of desktop 110 are stored in cloud storage system 103, more particular in the virtual desktops store 132. Such cloud-stored desktop is called a virtual desktop.

Upon request of client device 101 and based on the user identification, client device type, location and domain access, a list of available virtual desktops located in cloud storage system 132 is pushed back to client device 101. Thereto, client device 101 sends an HTTP request to HTTP cloud broker 102. The HTTP request contains a user identification, device type identification, location identification and access type identification. HTTP cloud broker 102 is an HTTP server that tunnels cloud IO events to different client devices using WebSockets or HTTP REST calls. HTTP cloud broker 102 tunnels the request received from client device 101 as GetUserDesktops( ) message 141 to cloud desktop agent 131. Cloud desktop agent 131 is a software daemon that resides in the cloud storage system 103. It is responsible for storing, selecting and deleting virtual desktops in virtual desktops store 132. Cloud desktop agent 131 can also access the IP VPN definitions of different corporations stored in VPN info store 133 in order to select a default corporate virtual desktop for client devices that request a virtual desktop before the user has successfully logged into the corporate network. Such default corporate virtual desktop will be returned upon cloud desktop agent 131 issuing a ResolveDesktopForIP( ) message including the IP address of client device 101. This will happen whenever client device 101 requests a virtual desktop without successfully authenticating the user.

With respective reference to FIG. 2, FIG. 3, FIG. 4 and FIG. 5, the scenario's for requesting/selecting a virtual desktop, storing a virtual desktop, sharing a virtual desktop between plural devices, and requesting/receiving a default virtual desktop in the cloud environment illustrated by FIG. 1, are described in more detail in the following paragraphs.

In FIG. 2, client device 201, cloud broker 202 and cloud desktop agent 203 correspond respectively to client device 101, cloud broker 102 and cloud desktop agent 131 of FIG. 1. FIG. 2 further depicts the message flow in the scenario followed for obtaining a cloud-stored virtual desktop. In this scenario, the user of client device 201 is first challenged with a login request, either over HTTP or a native application. After successfully providing his/her user credentials, client device 201 is redirected to HTTP cloud broker 202. As part of a virtual desktop request message named REQ_DT or 211 in FIG. 2, client device 201 provides a unique user identification, UserID, a device type identification, DeviceType, and if necessary, a device location identification, Location, and access type identification, AccessType. The latter can be an identification of the corporation in case of corporate network access. HTTP cloud broker 202 tunnels the request REQ_DT 211 to the cloud desktop agent 203 as part of a user desktop get request named GET_DT in FIG. 2. Upon receipt of GET_DT 212, cloud desktop agent 203 will select an appropriate set of virtual desktops for that user, device type and eventual location and access type. The list of appropriate virtual desktops for that user is returned to cloud broker 202 as part of the message LST_DT 213. As is shown in FIG. 2, this message 213 also contains the user identification UserID of the user for which it is destined. Cloud broker 202 forwards the list of appropriate virtual desktops to client device 201 as is indicated by LST_DT 214. The user thereupon can select and open the virtual desktop of his/her choice.

In FIG. 3, client device 301, cloud broker 302 and cloud desktop agent 303 correspond respectively to client device 101, cloud broker 102 and cloud desktop agent 131 of FIG. 1. FIG. 3 further depicts the message flow in the scenario followed for saving a virtual desktop, either a newly created or an updated virtual desktop, in cloud storage system 103. The client device 301 thereto sends a save message, named SAVE_DT or 311 in FIG. 3, to cloud broker 302. The SAVE_DT message 311 contains the desktop metadata, i.e. the user identification UserID of the user that created/updated the virtual desktop, the device type identification DeviceType, the location identification Location and access type identification AccessType for which the virtual desktop is appropriate. The SAVE_DT message 311 may also contain a private flag. Cloud broker 302 further tunnels this message as part of SAVE_DT message 312 to cloud desktop agent 303 enabling the latter to store or update the virtual desktop definition and metadata in the cloud store.

Figure 4:
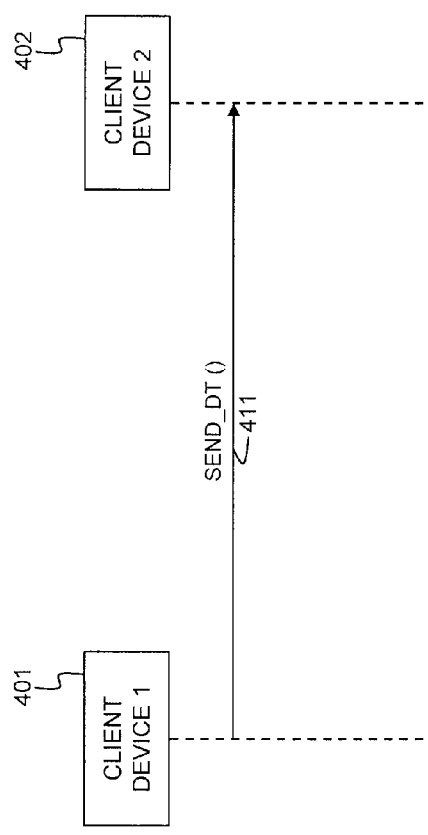
FIG. 4 illustrates exchange of a virtual desktop that can be obtained through the method according to the present invention between different client devices.

In FIG. 4, two client devices, CLIENT DEVICE 1 or 401 and CLIENT DEVICE 2 or 402, are depicted. These client devices may belong to the same user or to different users. FIG. 4 further depicts the message flow in the scenario followed for sharing a virtual desktop between these two client devices 401 and 402. It is important to note that in the context of the current invention, the concept of virtual desktop sharing doesn't refer to the sharing of the desktop sessions using remote login, but refers only to sharing the desktop preferences as defined in the virtual desktop definition. The user of client device 401 may wish to send a virtual desktop he/she has created or opened with another device 402. In such case, the virtual desktop definition is sent from the first device 401 to the second device 402 without a need to pass through the HTTP cloud broker. This is indicated by the desktop send message SEND_DT or 411 in FIG. 4. The same process can be used for virtual desktop sharing between different devices of a single user and between devices of different users. Nevertheless, access to the cloud data is still subject to the default login process, which happens prior to accessing any cloud data.

Figure 5:
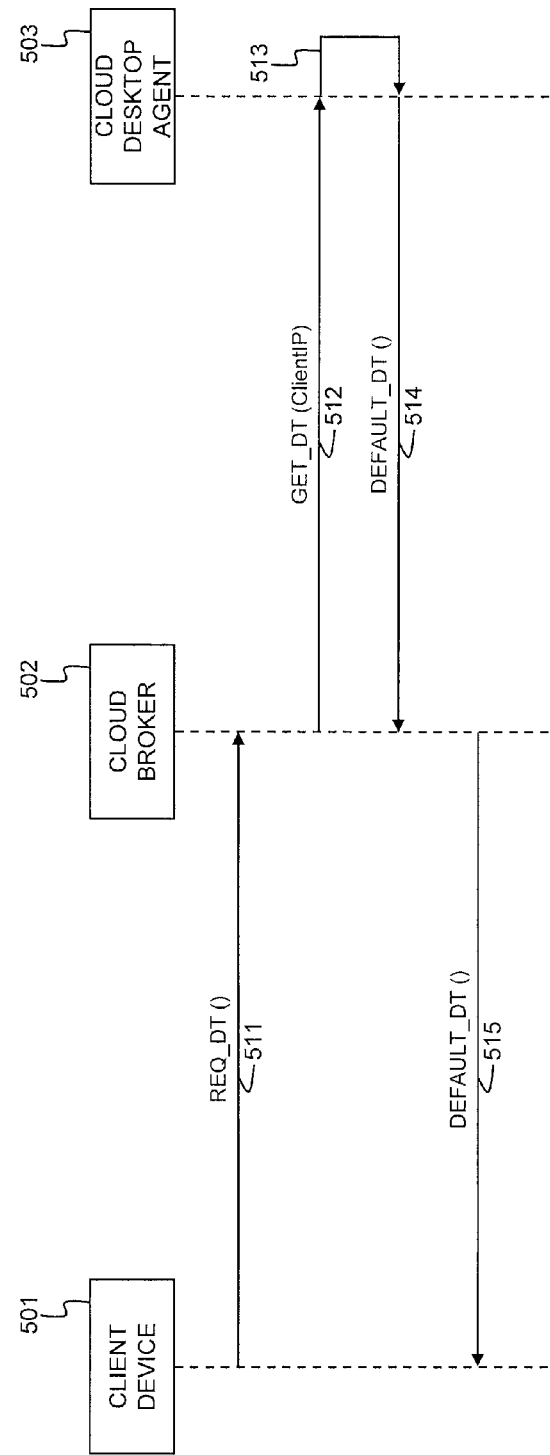
FIG. 5 illustrates an embodiment of the method according to the present invention wherein a default corporate virtual desktop can be obtained prior to authentication.

In FIG. 5, client device 501, cloud broker 502 and cloud desktop agent 503 correspond respectively to client device 101, cloud broker 102 and cloud desktop agent 131 of FIG. 1. FIG. 5 further depicts the message flow in the scenario followed for obtaining a cloud-stored default corporate virtual desktop. In case that a user comes with his own device 501, e.g. a tablet PC, a laptop, a smartphone, . . . into the office of a corporation, it is very likely that the client device 501 will automatically connect to the corporate network, even prior to user actually logging into the corporate network with his credentials. Most of the devices with WiFi access endpoints will automatically connect to the corporate network if they have been connected already in the past. In such case, even prior to login, the user can be challenged with a more customized login integrated in a default corporate virtual desktop, since the IP address in the request that comes from client device 501 may be correlated with a corporation that has this IP address in its IP address range. Client device 501 thereto sends a virtual desktop request, REQ_DT or 511, to cloud broker 502, which further tunnels the request to cloud desktop agent 503 as part of the desktop get request GET_DT or 512. This GET_DT request 512 contains the IP address of client device 501 enabling the cloud desktop agent 503 to compare this IP address with the IP addresses listed for corporate VPNs. Resolving the IP address against the VPN information where cloud desktop agent 503 has access to is represented by arrow 513 in FIG. 5. In case the IP address belongs to an IP address range of a corporate VPN, the cloud desktop agent 503 shall return the default corporate virtual desktop of that corporation in message DEFAULT_DT or 514. Cloud broker 502 upon receipt of DEFAULT_DT message 514 forwards this message to client device 501 as is indicated by 515 in FIG. 5

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method to obtain a virtual desktop comprising a set of user preferences, applications and shortcuts to files that a user desires to access, said virtual desktop being stored in a cloud storage system, said method comprising the steps of:
   (A) transferring from a client device of said user to a cloud broker a virtual desktop request comprising at least a user identification, an access type identification, and a client device type identification;
   (B) passing said virtual desktop request from said cloud broker to a cloud desktop agent responsible for maintenance of virtual desktops and virtual desktop metadata in said cloud storage system;
   (C) selecting by said cloud desktop agent a list of available virtual desktops for said user, said access type, and said client device type based on a comparison of said virtual desktop request with said virtual desktop metadata;
   (D) transferring in response to said virtual desktop request from said cloud desktop agent to said cloud broker said list of available virtual desktops; and
   (E) forwarding said list of available virtual desktops from said cloud broker to said client device to enable said user to select a virtual desktop to be opened.

2. The method to obtain a virtual desktop according to claim 1, said method further comprising the step of transferring user credentials of said user from said client device to said cloud broker, authenticating said user at said cloud broker, and executing said steps B, C and D only after successful authentication.

3. The method to obtain a virtual desktop according to claim 1, wherein said virtual desktop request further comprises a location identification, and wherein in said step C a list of available virtual desktops for said user, said client device type and said location is selected based on a comparison of said virtual desktop request with said virtual desktop metadata.

4. The method to obtain a virtual desktop according to claim 1, further comprising the step of: re-directing said user request to a private virtual desktop environment in case said access type is private access or re-directing said user request to a corporate virtual desktop environment in case said access type is corporate access.

5. The method to obtain a virtual desktop according to claim 1, further comprising for corporate type access the steps of: verifying at said cloud desktop agent which Virtual Private Networks or VPNs are registered.

6. The method to obtain a virtual desktop according to claim 1, further comprising corporate type of access the steps of: returning a default corporate virtual desktop upon unsuccessful authentication.

7. The method to obtain a virtual desktop according to claim 1, further comprising the steps of: returning a default login page upon access from a public IP address.

8. A method to obtain a virtual desktop according to claim 1, wherein said virtual desktop request is an HyperText Transfer Protocol or HTTP request and said cloud broker is an HTTP broker.

9. A computer system comprising a cloud broker adapted to tunnel cloud TO events to/from different client devices in a cloud storage environment in order to enable a user to obtain a virtual desktop comprising a set of user preferences, applications and shortcuts to files that said user desires to access, said virtual desktop being stored in said cloud storage system, said cloud broker comprising:
   (A) an interface configured to receive from a client device of a user a virtual desktop request comprising at least a user identification, an access type identification, and a client device type identification;
   (B) an interface configured to tunnel said virtual desktop request to a cloud desktop agent responsible for maintenance of virtual desktops and virtual desktop metadata in said cloud storage system;
   (C) an interface configured to receive in response to said virtual desktop request from said cloud desktop agent a list of available virtual desktops for said user, said access type, and said client device type, said list of available virtual desktops being selected by said cloud desktop agent based on a comparison of said virtual desktop request with said virtual desktop metadata; and
   (D) an interface configured to forward said list of available virtual desktops to said client device to enable said user to select a virtual desktop to be opened.

10. A cloud storage system comprising a cloud desktop agent able to maintain virtual desktops and virtual desktop metadata in a cloud storage system in order to enable a user to obtain a virtual desktop comprising a set of user preferences, applications and shortcuts to files that said user desires to access, said virtual desktop being stored in said cloud storage system, said cloud desktop agent comprising:
   (A) an interface configured to receive from a cloud broker a virtual desktop request comprising at least a user identification, an access type identification, and a client device type identification;
   (B) virtual desktop selection logic, adapted to select a list of available virtual desktops for said user, said access type, and said client device type based on a comparison of said virtual desktop request with said virtual desktop metadata; and
   (C) an interface configured to send in response to said virtual desktop request to said cloud broker a list of available virtual desktops, to thereby enable said cloud broker to forward said list of available virtual desktops to said client device to enable said user to select a virtual desktop to be opened.

* * * * *